3,218,269
POLYMERIZATION OF EPOXIDES WITH AN ALKYLALUMINUM-TRIALKYL ORTHOVANADATE CATALYST
Edwin J. Vandenberg, Wilmington, Del., assignor to Hercules Powder Company, Wilmington, Del., a corporation of Delaware
No Drawing. Filed May 13, 1960, Ser. No. 28,842
12 Claims. (Cl. 260—2)

This invention relates to a new process of polymerizing epoxides and more particularly, to an improved process of polymerizing epoxides with a catalyst formed by mixing an organoaluminum compound with an alkyl vanadate ester.

The use of organoaluminum compounds alone as epoxide polymerization catalysts is known. It has now been discovered that by using a catalyst formed by mixing a trialkyl orthovanadate with an organoaluminum compound, higher conversions and yields of high molecular weight polymers are obtained than when an organoaluminum compound is used alone. There results could not have been foreseen since trialkyl orthovanadates by themselves do not catalyze the polymerization of epoxides.

In accordance with the foresaid discovery, the present invention relates to the process of polymerizing at least one epoxide wherein the epoxy group is an oxirane ring which comprises contacting said epoxide with a preformed catalyst prepared by mixing an organoaluminum compound with a trialkyl orthovanadate in the molar ratio of from about 1.2:1 to about 5:1.

Before describing the invention in greater detail, the following examples are presented for the purpose of illustration, parts and percentages being by weight unless otherwise specified. The molecular weights of the polymers are indicated by the reduced specific viscosity (RSV). By the term "reduced specific viscosity" is meant the specific viscosity measured on a solution containing 0.1 g. of the polymer in 100 ml. of solution divided by the concentration (0.1%) of the solution. The solvent and temperature of each RSV determination are given for each polymer.

*Examples 1–4*

A series of four runs was conducted in which poly(epichlorohydrin) was prepared. In each example the catalyst was formed by mixing triisobutylaluminum with triethyl orthovanadate in a 2:1 molar ratio in n-heptane at a 0.125 molar vanadium concentration under nitrogen. After the formation, each catalyst was aged at room temperature. In each run a polymerization vessel was charged under nitrogen with 12.9 parts of diethyl ether and 10 parts of epichlorohydrin. After equilibrating at 30° C., 5.5 parts of catalyst solution was injected into each reaction mixture and the mixture agitated at 30° C. for a predetermined length of time. The polymerization was stopped by adding 4 parts of anhydrous ethanol and each mixture was then diluted with 40 parts of diethyl ether, after which the ether-insoluble polymer was filtered and washed twice with ether. The insoluble polymer was purified by slurrying with a 1% solution of hydrogen chloride in ethanol. Each polymer was again collected by filtration, washed with methanol until neutral, then with a 0.4% solution of 4,4'-thiobis(6-tert-butyl-m-cresol) in methanol and finally dried for 16 hours at 50° C. under vacuum.

In Table I are set forth for each example the age of the catalyst when used, the reaction time, the percentage conversion, and the RSV of the poly(epichlorohydrin).

TABLE I

| Example | Age of catalyst when used (hrs.) | Reaction time (hrs.) | Percent conversion | RSV* |
|---|---|---|---|---|
| 1 | 0.5 | 19 | 14.2 | 2.9 |
| 2 | 0.6 | 71 | 21.0 | 3.2 |
| 3 | 2 | 71 | 16.3 | 2.9 |
| 4 | 21 | 71 | 14.3 | 3.0 |

*In α-chloronaphthalene at 100° C.

*Example 5*

A polymerization of epichlorohydrin was conducted exactly the same as in Example 1 except the molar ratio of triisobutylaluminum to triethyl orthovanadate in the catalyst was 1:1. Only a trace of a black colored polymer was obtained.

This example demonstrates the need for an excess of organoaluminum compound in the catalyst.

*Example 6*

A polymerization of epichlorohydrin was conducted as described in Examples 1–4 over a period of 18 hours using a catalyst formed by mixing triisobutylaluminum with triethyl orthovanadate in a 4:1 molar ratio and then aging 10 minutes. The total parts of catalyst solution used amounted to 5.5 parts, which was added in two equal portions 15 minutes apart.

The poly(epichlorohydrin) product was isolated as described in Examples 1–4. The total conversion amounted to 33.9%, 62% of the total being an ether-insoluble polymer. The remainder was an ether-soluble, semisolid wax. The ether-insoluble polymer was extracted with cold acetone whereby two fractions were obtained, 72% of an acetone-insoluble crystalline poly(epichlorohydrin) having an RSV of 3.6 (α-chloronaphthalene at 100° C.) and 28% of an acetone-soluble amorphous poly(epichlorohydrin) having an RSV of 1.0.

*Example 7*

A polymerization vessel was charged under nitrogen with 29.3 parts of n-heptane and 10 parts of ethylene oxide. After equilibrating at 30° C., 5.5 parts of the same triisobutylaluminum triethyl orthovanadate catalyst solution as was used in Example 2 was injected into the reaction mixture. After agitating for 19 hours at 30° C., the polymerization was stopped by adding 4 parts of anhydrous ethanol. The ether-insoluble polymer product was isolated by adding excess ether to the reaction mixture, filtering and then washing with ether, then with 0.5% hydrogen chloride in an 80:20 mixture of ether:methanol, with ether:methanol alone and then with ether containing 0.5% 4,4'-thiobis(6-tert-butyl-m-cresol). The conversion to poly(ethylene oxide) (RSV 4.4 in chloroform at 25° C.) amounted to 20%. The poly(ethylene oxide) was a soft, fibrous solid.

*Example 8*

Following the procedure of Example 7 propylene oxide (10 parts) in 65.3 parts of n-heptane was polymerized in the presence of 2.8 parts of the triisobutylaluminum-triethyl orthovanadate solution used as in Example 2. The ether-soluble poly(propylene oxide) produced was isolated by adding sufficient ether to make the solution of low viscosity for ease in handling, then washing the reaction mixture first with a 3% aqueous solution of hydrogen chloride, then with water until neutral, then with a 2% aqueous solution of sodium bicarbonate and again with water until neutral. After adding 4,4'-thiobis(6-tert-butyl-m-cresol) equal to 0.5% based on the polymer, the ether was evaporated and the polymer was dried. The poly(propylene oxide) isolated was a fairly tough rubber having an RSV of 2.1 (in benzene at 25° C.).

*Example 9*

A mixture of 9 parts of propylene oxide and 1 part allyl glycidyl ether in 65.3 parts of n-heptane, was copolymerized by the process described in Example 7 in the presence of 2.8 parts of the same triisobutylaluminum-triethyl orthovanadate solution. The ether-soluble copolymer product was isolated by the same method as described in Example 8. The isolated propylene oxide-allyl glycidyl ether copolymer was a tacky rubber having an RSV of 2.1 (in benzene at 25° C.).

*Example 10*

Following the procedure of Example 7 ethylene oxide (10 parts) in 29.3 parts of n-heptane was polymerized in the presence of 5.5 parts of a diisobutylaluminum hydride-triethylorthovanadate solution. The catalyst solution was prepared by mixing diisobutylaluminum hydride with triethylorthovanadate in a 2:1 molar ratio in n-heptane at a 0.125 molar vanadium concentration under nitrogen and aging for about 5 minutes. The ether-insoluble polymer product was isolated and purified as described in Example 7. High molecular weight poly(ethylene oxide) was recovered in a high yield.

Any epoxide, in which the epoxide is an oxirane ring, can be homopolymerized, or copolymerized with another epoxide, by the process of this invention. Exemplary of such epoxides are the alkylene oxides such as ethylene oxide, propylene oxide, butene oxides, isobutylene epoxide, substituted alkylene oxides such as epichlorohydrin, epibromohydrin, methallyl chloride epoxide, trifluoromethyl ethylene oxide, perfluoropropylene oxide, perfluoroethylene oxide, vinyl chloride epoxide, dichloroisobutylene epoxides, 1,2-dichloro-3,4-epoxybutane, 1-chloro-3,4-epoxybutane, 1-chloro-4,5-epoxypentane, 1,1-dichloro-2,3-epoxypropane, 1,1,1-trichloro-2,3-epoxypropane, 1,1,1-trichloro-3,4-epoxybutane, etc., cycloaliphatic epoxides such as cyclohexene oxides, vinyl cyclohexene oxides (mono- and dioxides), α-pinene epoxide, dipentene epoxide, etc., epoxy ethers such as alkyl glycidyl ethers as, for example, methyl glycidyl ether, ethyl glycidyl ether, isopropyl glycidyl ether, isobutyl glycidyl ether, tert-butyl glycidyl ether, n-hexyl glycidyl ether, n-octyl glycidyl ether, etc., phenyl glycidyl ether, chlorophenyl glycidyl ethers, nitrophenyl glycidyl ethers, alkylphenyl glycidyl ethers, chloroalkyl glycidyl ethers, such as chloroethyl glycidyl ether, bromoethyl glycidyl ether, 2-chloro-1-methyl ethyl glycidyl ether, unsaturated glycidyl ethers such as vinyl glycidyl ether, allyl glycidyl ether, etc., glycidyl esters such as glycidyl acetate, glycidyl propionate, glycidyl pivalate, glycidyl methacrylate, glycidyl acrylate, etc., alkyl glycidates such as methyl glycidate, ethyl glycidate, etc., and other epoxes as, for example, styrene oxide, α-methylstyrene oxide, butadiene mono- and dioxides, epoxy stearates, 1-dimethylamino-2,3-epoxypropane, trimethyl 2,3-epoxypropyl ammonium chloride, etc. Alkylene oxides and the mono-substituted derivatives thereof such as ethylene oxide, propylene oxide, epichlorohydrin, epibromohydrin, etc., are most preferred.

Exemplary of the organoaluminum compounds that can be used are: trialkylaluminum compounds, tricycloalkylaluminum compounds, triarylaluminum compounds, dialkylaluminum hydrides, monoalkylaluminum dihydrides, dialkylaluminum halides, monoalkylaluminum dihalides, dialkylaluminum alkoxides, monoalkylaluminum dialkoxides, and complexes of these compounds as, for example, the alkali metal aluminum tetraalkyls such as lithiumaluminum tetraalkyl, etc. Thus, these organoaluminum compounds can be defined as any aluminum compound containing an aluminum to carbon bond and having the formula $AlRX_2$ where R is an alkyl such as methyl, ethyl, propyl, isopropyl, n-butyl, isobutyl, amyl, hexyl, octyl, decyl, etc., cycloalkyl such as cyclohexyl, etc., or aryl, such as phenyl, tolyl, halophenyl, etc. and X can be the same as R or hydrogen, a halogen such as chlorine, fluorine, or bromine, alkoxy such as methoxy, ethoxy, isopropoxy, butoxy, isobutoxy, t-butoxy, etc., or the radical

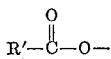

such as acetoxy, stearoxy, benzoxy, etc. Another group of these compounds are those formed by reacting an aluminum alkyl with a polyol such as ethylene glycol, propylene glycol, glycerin, pentaerythritol, sorbitol, catechol, resorcinol, etc., in which case the X in the above formula would be $-O-R''-O-AlRX$ where $R''$ is alkylene, phenylene, etc. In some cases it may be desirable to complex the organoaluminum compound with a complexing agent such as tetrahydrofuran as, for example, triisobutyl aluminum complexed with a molar amount of tetrahydrofuran, etc. The most preferred organoaluinum compounds employed in this invention are dialkylaluminum hydrides and trialkylaluminum compounds.

Regardless of the organoaluminum compound selected, it is mixed with a trialkyl orthovanadate in a molar ratio of from about 1.2:1 to about 5:1 and preferably from about 1.5:1 to about 3:1. The trialkyl orthovanadates that can be used are esters of orthovanadic acid and have the formula $VO(OR)_3$ where R is an alkyl group containing from about 1 to 12 carbon atoms, such as methyl, ethyl, propyl, isopropyl, t-butyl, etc.

Various procedures can be used for mixing the organoaluminum compound with the trialkyl orthovanadate. As stated before, the catalyst is preformed and then added to the polymerization mixture. This can readily be done by adding the specified amount of trialkyl orthovanadate to a solution of the organoaluminum compound in an inert diluent, as, for example, a hydrocarbon such as n-hexane, toluene, or an ether such as diethyl ether or a mixture of such diluents. After mixing, it is desirable to age the catalyst. Aging for only a few seconds is sufficient and this lapse of time is generally inherent in transferring the catalyst.

The exact nature of the catalyst is not known; however, it is believed the organoaluiminum compound reacts with the trialkyl orthovanadate to reduce the vanadium to a lower valence state.

Any amount of catalyst product can be used to catalyze the polymerization process in accordance with this invention from a minor catalytic amount up to a large excess but, in general, will be within the range of from about 0.2 to 10 mole percent based on the monomer being polymerized and preferably will be within the range of from about 1 to about 5 mole percent based on the monomer being polymerized. The amount used depends in part on such factors as monomer purity, diluent purity, etc., less pure epoxides and diluents requiring more catalyst to destroy reactive impurities. In order to decrease catalyst consumption, it is generally preferred that impurities such as carbon dioxide, oxygen, aldehydes, alcohols, etc., be kept at as low a level as practical.

The polymerization reaction can be carried out by any desired means, either as a batch or continuous process with the catalyst added all at one time or in increments during the polymerization or continuously throughout the polymerization. If desired, the monomer can be added gradually to the polymerization system. It can be carried out as a bulk polymerization process, in some cases at the boiling point of the monomer (reduced or raised to a convenient level by adjusting the pressure) so as to remove the heat of reaction. However, for ease of operation, it is more generally carried out in the presence of an inert diluent. Any diluent that is inert under the polymerization reaction conditions can be used as, for example, ethers such as the dialkyl aryl or cycloalkyl ethers as, for example, diethyl ether, dipropyl ether, diisopropyl ether, aromatic hydrocarbons such as benzene, toluene, etc., or saturated aliphatic hydrocarbons and cycloaliphatic hydrocarbons such as n-heptane, cyclohexane, etc., and halogenated hydrocarbons as, for example, chlorobenzene or haloalkanes such as methyl chloride, methylene chloride, chloroform, carbon tetrachloride, ethylene dichloride, etc. Obviously, any mixture of such diluents can be used and in many cases is preferable. For example, when saturated aliphatic hydrocarbons are used as the diluent, it is preferable, particularly if high molecular weight polymers are desired or if very little diluent is present, to use them in admixture with ethers.

The polymeric epoxides produced in accordance with this invention can be used for a wide variety of applications. Many of these polymers are rubber-like in nature and hence, can be used as lube oil additives, wax additives, caulking compounds, adhesive components, etc., and when vulcanized, as compositions for gaskets, hoses and rubber compositions in general. Others are crystalline and are useful as plastics, as film formers, in coatings, for fibers, etc.

What I claim and desire to protect by Letters Patent is:

1. The process of preparing solid poly(epoxides) which comprises polymerizing epoxides, wherein the epoxy group is an oxirane ring, by contacting at least one of said epoxides with a preformed catalyst prepared by reacting in an inert liquid organic diluent an alkylaluminum compound with a trialkyl orthovanadate in the molar ratio of from about 1.2:1 to about 5:1, the alkyl groups of said trialkyl orthovanadate containing from 1 to 12 carbon atoms and said epoxides being free of groups other than oxirane groups which are reactive with said catalyst.

2. The process of claim 1 wherein said trialkyl orthovanadate is triethyl orthovanadate.

3. The process of claim 1 wherein the organoaluminum compound is reacted with the trialkyl orthovanadate in a molar ratio of from about 1.5:1 to about 3:1.

4. The process of claim 1 wherein the polymerization is carried out in an inert liquid hydrocarbon diluent.

5. The process of claim 1 wherein the polymerization is carried out in an inert ether diluent.

6. The process of claim 1 wherein epichlorohydrin is homopolymerized.

7. The process of claim 1 wherein ethylene oxide is homopolymerized.

8. The process of claim 1 wherein propylene oxide is homopolymerized.

9. The process of claim 1 wherein propylene oxide and allylglycidyl ether are copolymerized.

10. The process of preparing solid poly(epoxides) which comprises polymerizing epoxides, wherein the epoxy group is an oxirane ring, by contacting at least one of said epoxides with a preformed catalyst prepared by reacting in an inert liquid organic diluent an alkylaluminum compound selected from the group consisting of trialkylaluminums and dialkyl aluminum hydrides with a trialkyl orthovanadate in the molar ratio of from about 1.2:1 to about 5:1, the alkyl groups of said trialkyl orthovanadate containing from 1 to 12 carbon atoms and said epoxides being free of groups other than oxirane groups which are reactive with said catalyst.

11. The process of claim 10 wherein the organoaluminum compound is triisobutylaluminum.

12. The process of claim 10 wherein the organoaluminum compound is diisobutylaluminum hydride.

References Cited by the Examiner
UNITED STATES PATENTS

| | | | |
|---|---|---|---|
| 2,699,457 | 1/1955 | Ziegler et al. | 260—9.49 |
| 2,870,100 | 1/1959 | Stewart et al. | 260—2 |
| 2,933,482 | 4/1960 | Stampa et al. | 260 |
| 2,962,451 | 11/1960 | Schreyer | 260—88.2 |

OTHER REFERENCES

Kambara et al., J. Pol. Sci., vol. 27, (No. 115) (1958).

WILLIAM H. SHORT, *Primary Examiner.*

B. MANGAN, LOUISE P. QUAST, *Examiners.*